United States Patent

[11] 3,607,925

| [72] | Inventors | Jacques Boichard<br>Irigny, Rhone;<br>Bernard Brossard, Lyon, Rhone; Michel<br>Gay, Lyon, Rhone; Raymond Janin, Lyon,<br>Rhone, all of France |
|---|---|---|
| [21] | Appl. No. | 762,561 |
| [22] | Filed | Sept. 25, 1968 |
| [45] | Patented | Sept. 21, 1971 |
| [73] | Assignee | Rhone-Poulenc S. A.<br>Paris, France |
| [32] | Priority | Sept. 26, 1967 |
| [33] | | France |
| [31] | | 122338 |

[54] PROCESS FOR THE PREPARATION OF ACETIC ACID
8 Claims, 1 Drawing Fig.

| [52] | U.S. Cl. | 260/533 R |
|---|---|---|
| [51] | Int. Cl. | C07c 53/08 |
| [50] | Field of Search | 260/533 |

[56] References Cited
UNITED STATES PATENTS

| 2,847,465 | 8/1958 | Robertson et al. | 260/533 R |
|---|---|---|---|
| 3,431,297 | 3/1969 | Brockhaus | 260/533 R |

*Primary Examiner*—James A. Patten
*Assistant Examiner*—Richard D. Kelly
*Attorney*—Cushman, Darby & Cushman ABSTRACT: Acetic acid is made by oxidizing but-2-ene with nitric acid in the presence of a vanadium catalyst.

PATENTED SEP 21 1971 3,607,925
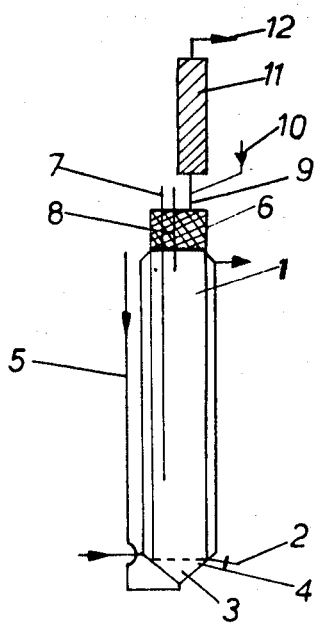
Inventors
Jacques Boichard,
Bernard Brossard,
Michel Gay & Raymond Janin
By Cushman, Darby & Cushman
Attorneys

PROCESS FOR THE PREPARATION OF ACETIC ACID

This invention relates to the preparation of acetic acid from but-2-ene.

It has already been proposed to oxidize linear butenes in the gaseous phase to acetic acid with air at temperatures from 250° to 300° C. under a pressure from 1 to 4.5 bars, in the presence of a vanadate of titanium, zinc, aluminum or antimony as catalyst. Under these conditions, the yield of acetic acid is at most 70 percent. However, the oxidation of linear butenes in the liquid phase to acetic acid has been unsuccessful [Brockhaus, Chemie Ing. Techn. 38 (10) 1039 (1966)].

The present invention provides a process for the preparation of acetic acid from but-2-ene, which comprises contacting but-2-ene with nitric acid in the presence of a vanadium catalyst.

The temperature of the reaction can be from 20° to 100° C. and is preferably from 40° to 80° C. Although it is unnecessary to use pressures above atmospheric to obtain good yields, it is possible to work under superatmospheric pressure without departing from the invention.

The concentration of the nitric acid can vary within wide limits. Concentrations which are between 20 and 90 percent by weight are generally quite suitable. During the reaction, it is possible, depending on the concentrations of the nitric acid used initially, to allow the concentration of the nitric acid in the medium to fall or to keep it close to its initial value by adding fresh nitric acid and optionally nitric acid produced by the oxidation of the nitrous vapors produced by the reaction.

The vanadium derivative used as catalyst is preferably soluble or at least partially soluble in nitric acid. The degree of oxidation of the vanadium is not critical. Suitable such derivatives are vanadium pentoxide ($V_2O_5$), vanadium halides such as $VF_5$, vanadium oxyhalides such as $VOF_3$, $VOBr_3$ and $VOCl_3$, vanadic sulfate ($V_2O_5.2SO_3$), vanadic nitrate or phosphate, alkali metal or ammonium orthovanadates [$Na_3VO_4$; $K_3VO_4$; $(NH_4)_3VO_4$], metavanadates such as $LiVO_3$, $NaVO_3$, $NH_4VO_3$, hypovanadates ($Na_2V_4O_9.4H_2O$; $K_2V_4O_9$), and hexavanadates such as $Na_2O.3V_2O_5.3H_2O$, vanadyl sulfate ($VOSO_4O$), vanadylnitrate, vanadyl phosphate, and vanadium sulfates such as $VSO_4$ and $V_2(SO_4)_3$.

The quantity of vanadium derivative present in the oxidation medium can vary within wide limits, depending on the reaction conditions. Thus, the concentration of vanadium expressed as vanadium to 100 g. of nitric acid can be as low as $2\times10^{-4}$ g. up to as high as 1 g. or even more, a value lower than $10^{11}$ g. being perferred.

During the oxidation, nitrous vapors are formed. They can be reoxidized into nitric acid, either in the same oxidation medium (it is then appropriate to cause a stream of oxygen or of a gas containing oxygen, such as air, to pass into the reaction medium), or in an external oxidation zone.

The new process according to the invention can be operated continuously if the reactants used and the operating conditions are appropriately chosen. No other precautions need be taken besides the usual precautions involved in the manipulation of a mixture of an organic compound and nitric acid. The following examples illustrates the invention.

EXAMPLE

The installation used, which is shown in the accompanying drawing, comprises the following elements: a cylindrical reactor 1 made of glass and having a height of 500 mm., a diameter of 43 mm. and an effective volume of 700 cc., equipped with a double jacket and a bibcock (faucet) 2 at its base; a conical chamber 3 connected to the lower part of the reactor and closed at the level of connection of the latter by a plate 4 of fritted No. 3 glass (pores with an average diameter between $15\mu$ and $40\mu$); a pipe 5 for supply of but-2-ene and optionally of another gas, starting from the apex of the conical chamber and adapted to be connected to a source of but-2-ene or other gas; a reactor head formed by a ground-in plug 6 and equipped with a casing 7 for a platinum thermometric probe; a pipe 8 for the admission of oxygen and a pipe 9 connected at one end to a capillary tube 10 intended for the continuous admission of nitric acid into the reactor and at the other end to a coil-type condenser 11 supplied with a stream of ethylene glycol/water (50/50) at −5° C. to condense part of the nitrous vapors coming from the reactor. Circulating in the double jacket of the reactor is a stream of water at 45°–50° C. to keep the reaction mixture at the desired temperature. The effluent gases are conducted by means of the pipe 12 to an arrangement, not shown in the drawing, comprising a scrubbing column operating with water in countercurrent, a 110-volume hydrogen peroxide absorber to absorb the remainder of the nitrous vapors and then a gas chromatography analysis apparatus, for analysis of any untransformed but-2-ene and other gases leaving the reaction mixture.

Before commencing the operation, a slight nitrogen pressure is established beneath the fritted glass plate to avoid any admission of liquid into the chamber 3, and 594.8 g. of a solution obtained from 0.282 g. of sodium metavanadate, 665.6 g. of 93.5 percent nitric acid, and 190.5 g. of water, corresponding to an initial concentration of 72.6 percent nitric acid and 0.0137 percent by weight of vanadium metal, are then introduced into reactor 1.

The nitrogen admitted to chamber 3 is then replaced by but-2-ene and the latter is introduced as a constant rate of about 3.5 l./h. (expressed under standard pressure and temperature conditions). Simultaneously, oxygen is introduced through the pipe 8 at a constant rate of 2.0 to 2.5 l./h. (also measured at S.T.P.). The temperature of the reaction medium is 50° C. By means of a pump, 93.5 percent nitric acid is added via the capillary tube 10 in order partially to compensate for the fall in concentration of the nitric acid in the reaction medium. The flow of but-2-ene is maintained for 5 hours, during which period 77.5 g. of 93.5 percent nitric acid are added.

Altogether, 44 g. of but-2-ene, i.e. 0.786 mole, are caused to pass through. No but-2-ene was noted in the effluent gases. A slight nitrogen pressure is then reestablished beneath the fritted glass plate 4 and the reaction mass is kept for 2½ hours at 50° C., while reoxidizing and partially driving off the nitrous vapors towards the recovery arrangement by means of a stream of oxygen at 4.5 to 5 l./h. supplied through the pipe 8.

After cooling to 18° C., the reaction mixture is drawn off via bibcock (2). The weight of the reaction mixture has risen to 645.4 g. and the nitric acid concentration is 56.5 percent. An aliquot part of the mixture is steam distilled. In the aqueous distillate containing the organic acids formed, there is no trace of formic acid (detectable by measurement with mercuric chloride). Vapor-phase chromatography of the distillate shows that the latter contains acetic acid only. Potentiometric titration of the latter shows that 1.35 moles of acetic acid have been formed.

We claim:

1. A liquid phase process for the preparation of acetic acid which comprises contacting but-2-ene with nitric acid in the presence of a vanadium compound as catalyst.

2. Process according to claim 1 in which the nitric acid is at a temperature of 20° to 50° C.

3. Process according to claim 2 in which the nitric acid is at a temperature of 40° to 80° C.

4. Process according to claim 1 in which the nitric acid has a concentration of 20 percent to 90 percent by weight.

5. Process according to claim 1 in which the concentration of the vanadium catalyst is from $2\times10^{14}$ g. to 1 g. (expressed as vanadium) per 100 g. of nitric acid.

6. Process according to claim 1 in which the concentration of the vanadium catalyst is lower than $10^{11}$g. (expressed as vanadium) per 100 g. of nitric acid.

7. Process according to claim 1 in which the vanadium catalyst is vanadium pentoxide, a vanadium halide, vanadium oxyhalide, vanadic sulfate vanadic nitrate, vanadic phosphate, an alkali metal or ammonium orthovanadate, metavanadate, hypovanadate or hexavanadate, vanadyl sulfate, vanadyl nitrate, vanadyl phosphate, or a vanadium sulfate.

8. Process according to claim 7 in which the vanadium catalyst is sodium metavanadate.